United States Patent [19]

Richman

[11] 3,973,889

[45] Aug. 10, 1976

[54] DECORATIVE ROD MAKING EQUIPMENT

[75] Inventor: Seymour I. Richman, Rochester, N.Y.

[73] Assignee: Rochester Button Company, Rochester, N.Y.

[22] Filed: Oct. 24, 1975

[21] Appl. No.: 625,780

Related U.S. Application Data

[60] Division of Ser. No. 512,845, Oct. 7, 1974, which is a continuation of Ser. No. 300,134, Oct. 24, 1972, abandoned.

[52] U.S. Cl. ............................... 425/130; 425/801
[51] Int. Cl.² .......................................... B29C 9/00
[58] Field of Search ................... 425/130, 134, 801

[56] References Cited
UNITED STATES PATENTS

| | | | |
|---|---|---|---|
| 3,240,849 | 3/1966 | Eulgem et al. | 264/73 X |
| 3,505,448 | 4/1970 | Zijp et al. | 264/331 X |
| 3,562,379 | 2/1971 | Duggins | 264/216 X |
| 3,765,809 | 10/1973 | Farrell | 264/148 X |

*Primary Examiner*—Richard B. Lazarus
*Attorney, Agent, or Firm*—Stonebraker, Shepard & Stephens

[57] ABSTRACT

Button rods are made of different colored resins containing thixotropic agents and having catalyst and promoter agents added to separated portions of each resin so that when the resins are combined their gel time is accelerated. The combined resins are mixed both for mixing purposes and to lower the apparent viscosity, and the resins are fed through nozzles and into an inclined trough. The nozzles are reciprocated in arcs to lay the resins in a zig zag pattern in the trough, and the resins flow from the trough into an inclined casting tube where they quickly attain a relatively high apparent viscosity until they are removed from the tube before completely hard. The rods can then be sliced into button blanks or hardened and ground into beads.

11 Claims, 4 Drawing Figures

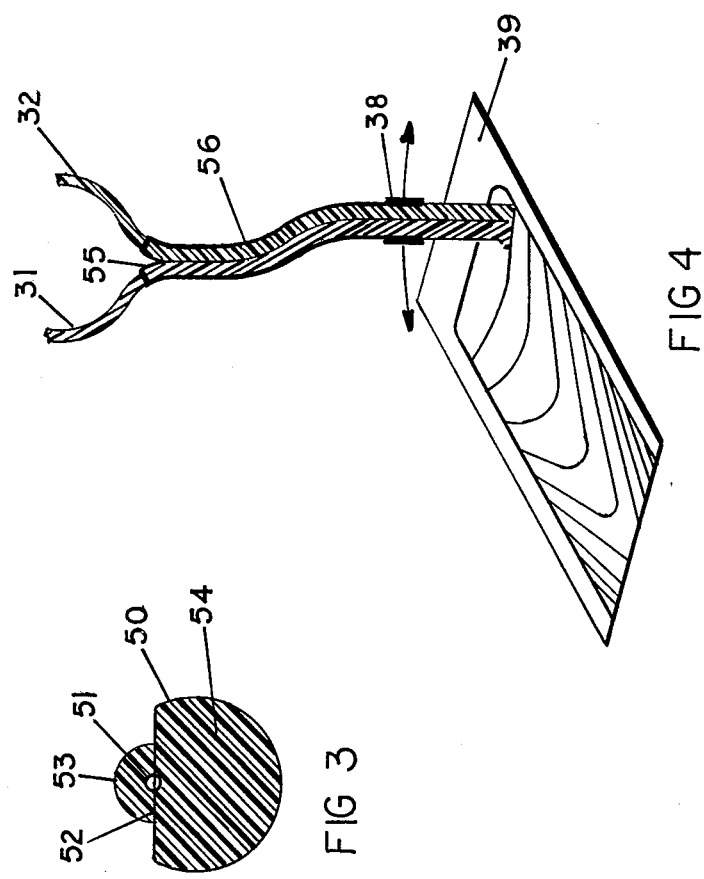
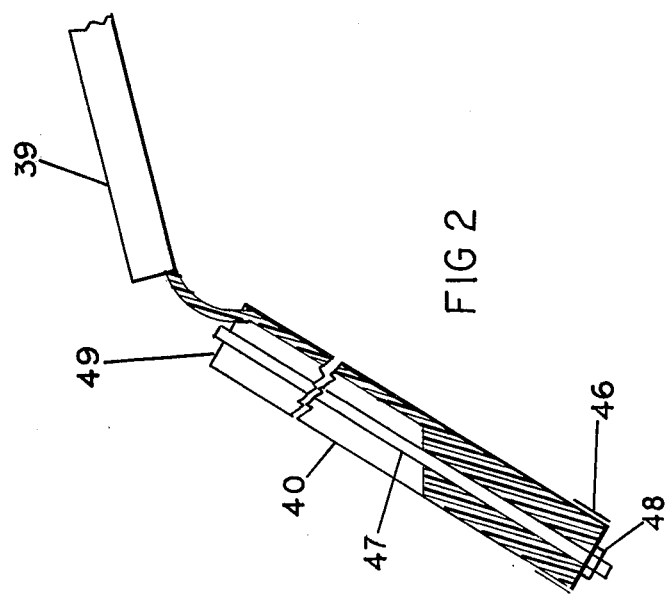

DECORATIVE ROD MAKING EQUIPMENT

This is a division of parent application Ser. No. 512,845, filed Oct. 7, 1974, entitled DECORATIVE ROD MAKING, which is a continuation of grandparent application Ser. No. 300,134, filed Oct. 24, 1972 and abandoned upon filing of the parent application.

THE INVENTIVE IMPROVEMENT

Improvements have long been sought in making multi-colored buttons, balls, beads, handles, and other articles in mottled or attractive patterns and especially patterns simulating natural horn material. Also, it is commercially necessary to be able to reproduce patterns and coloring effects fairly accurately. One way this has been attempted is by making buttons and beads of different colored resin materials formed into the desired pattern, and the invention improves upon such attempts.

The invention aims at attractive and reproducible patterns of different colored resins with clarity between the colors and without bubbles, muddiness, or other defects. The invention also aims at speed, efficiency, economy, and low cost attractive buttons, balls, beads and other articles made in a practical, controllable, and manageable industrial process.

SUMMARY OF THE INVENTION

The inventive method produces a rod for making buttons, balls, beads and other articles by using resin material in which a thixotropic agent and coloring material is mixed to produce a plurality of different colored, thixotropic, resins. Catalyst and promoter agents are added to separate portions of the colored resins, and the portions of each color are combined as needed and mixed to form accelerated resins of low apparent viscosity. Each resin is fed through nozzle means into an inclined trough, and the nozzle means is moved in a pre-determined, reciprocal arc to lay the resins in a pre-determined, zig zag pattern in the trough. The resins are flowed for a pre-determined distance down the trough and into an inclined casting tube where they quickly attain a relatively high apparent viscosity. The resins partially harden in a rod that is removed from the tube and is suitable for slicing into button blanks or other workpieces. The invention also proposes rod-casting equipment including means for supplying thixotropic resins of different colors and metering pumps to force the resins through static, in-line mixers that reduce the apparent viscosity and feed the resins to nozzle means that are rotated reciprocally in an arc to lay the resins in a zig zag pattern in an inclined trough under the nozzles where they flow into an inclined casting tube and retain their pattern an a high apparent viscosity as they gel and harden.

DRAWINGS

FIG. 2 is a partially schematic, fragmentary, cross-sectional view of a preferred embodiment of a casting tube for use in the invention;

FIG. 3 is a transverse, cross-sectional view of another form of casting tube for use in the invention; and FIG. 4 is a fragmentary, schematic view of a nozzle arrangement for use in the invention.

DETAILED DESCRIPTION

Figure 1:
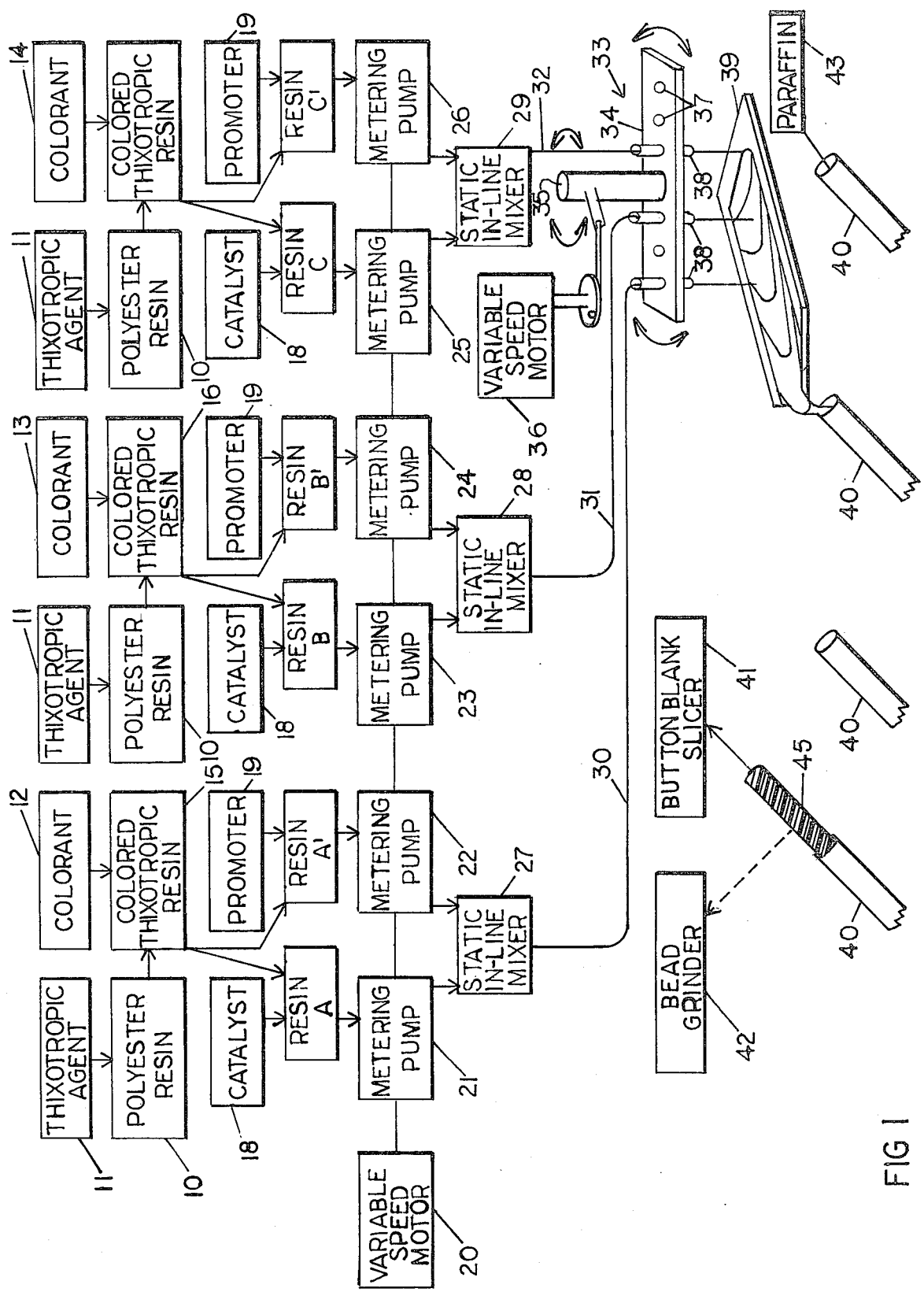
FIG. 1 is a schematic diagram of a preferred embodiment of the invention.

FIG. 1 best shows the inventive method and preferred equipment. The basic material for making decorative rods according to the invention is a suitable liquid resin material 10 that is preferably a polyester selected for generally known and desirable characteristics. FIG. 1 shows the processing of three separate quantities of resin 10 to form a rod having three colors, but of course, two colors, or four or more colors can also be used in a single rod if desired.

A thixotropic agent 11 is thoroughly mixed into each quantity of resin 10 to give the resin thixotropic properties. Several thixotropic agents are available for this, but a fumed silica sold under the name of CABOSIL is preferred. When thixotropic agent 11 is thoroughly mixed into resin 10 it produces a low apparent viscosity from 2500 to 6000 centipoise when the resin is mixed and agitated, and a rapid recovery to an apparent viscosity that is increased by 20 percent or more when the resin is left undisturbed for a few minutes. This thixotropic property is important to achieve the desired mottling or decorative effects. When agitated or mixed, thixotropic resins flow readily without entrapping air to allow the process to proceed speedily. Yet, when thixotropic resins are settled into a casting tube in the desired pattern, their apparent viscosity rises rapidly to prevent mixing or muddying of the different colors and to preserve a bright, clear, attractive, and undistorted pattern. Without thixotropic agent 11, the working viscosities for resins 10 would have to be substantially increased to preserve the color clarity and intended pattern, and this would slow down the process and cause substantial problems in the entrapment of air as the resins flow.

Colorants 12 – 14 are added to each quantity of resin material to produce three differently colored, thixotropic resins 15 – 17. Colorants 12 – 14 are thoroughly mixed into each quantity of resin, and any air entrapped in the resin is preferably removed by vacuum. Preferably a small quantity of Ethylene Glycol or other polar materials known to those skilled in the art is added to each of the resins 15 – 17 to enhance the effect of thixotropic agent 11.

Each color resin 15 – 17 is then divided in half as illustrated, and catalyst 18 and promotor 19 are thoroughly mixed into each half so that when the divided portions of each color resin are recombined, the resin is accelerated. Although many catalyst systems are available, a suitable peroxide and a cobalt compound are preferred respectively for catalyst 18 and promotor 19. Each portion of each colored resin is preferably stored in containers for feeding to rod making equipment, and such containers are preferably elevated to take advantage of gravity feed.

A variable speed motor 20 drives a series of metering pumps 21 – 26 for accurately metering all the resin portions at the same rate. The two portions of each color resin are then fed at an equal rate to static, in-line mixers 27 – 29 respectively where the resin portions are thoroughly mixed and blended together to form accelerated resins that partially harden in preferably 45 – 60 minutes. Flexible lines 30 – 32 lead from mixers 27 – 29 to a decorator 33 for forming the desired pattern for the rod. Several decorators 33 can be supplied by each set of metering pumps 21 – 26.

Decorator 33 has a nozzle support bar 34 on a rotatable shaft 35 that is driven reciprocally in an arc by variable speed motor 36 as illustrated by the arrows. Bar 34 then swings back and forth in an arc at the pace set by motor 36. Bar 34 has nozzle support stations 37 spaced at different radii from shaft 35 along bar 34, and nozzles 38 are held at pre-determined support stations 37. Flexible lines 30 – 32 lead to nozzles 38 so that a different colored resin material pours from each nozzle 38 as bar 34 oscillates.

The resin streams from nozzle 38 fall into an inclined trough 39 tilted a few degrees from the horizontal to establish the desired flow of resins. The tilt of trough 39 is preferably variable to achieve different effects, and the resin streams are laid in zig zag patterns in trough 39 as determined by the speed of motor 36 and the working radii of nozzles 38. The zig zag pattern is shaped as the total resin stream flows down trough 38, because the side edges of the flow proceed more slowly than the central portion of the flow. This gradually shapes the initial zig zag pattern into a succession of different colored curves that are somewhat parabolic in shape and simulate natural horn material. Many different patterns can be achieved by changing the positions and relationships of nozzles 38, the speed of motor 36, the tilt of trough 39, and other changes.

At the lower end of trough 39 the stream of patterned resins flows into a casting tube 40 that is inclined at an angle of preferably about 45° and is capped at its bottom so that it can be filled with patterned resin materials. As the resins settle in tube 40 they quickly recover a high apparent viscosity pursuant to their thixotropic capacity so that they set up as patterned without any blending or muddying of the separate colors. This makes the coloring variations across the rod clear, bright and pre-determined for an attractive pattern.

When tube 40 is filled, it is allowed to rest for an initial portion of the resin gel time at its angle of fill so that the resins can set sufficiently to prevent disturbance of the desired color pattern. Then tube 40 is run through temperature controlled baths to regulate the hardening of the resins. When the resins have achieved the desired hardness, but preferably before they are completely hard, the cast resin rod 45 is removed from tube 40 and fed to a button blank slicer 41. The preferred durometer for removing rod 45 from tube 40 is 50 or 60, and rod 45 is preferably placed in a cooling bath until its durometer reaches 60 – 80 which is preferred for slicer 41. The slicing knife in slicer 41 can cut button blank disks from rod 45 at a durometer of 60 – 80 without forcing the cut blanks out of round. If rod 45 is much harder, it cannot be sliced readily, and if it is much softer, the slicing distorts the cylindrical shape of the blanks.

Rod 45 can alternatively be hardened and fed to a centerless grinder 42 for grinding spherical beads or other shapes, and the durometer of rod 45 is then selected for optimum compatibility with grinder 42. Also, other articles can be made from rod 45 in generally known ways.

Tubes 40 are preferably formed of thin-walled aluminum conduit that is readily available in many sizes, and to facilitate removal of rods 45 from tubes 40, tubes 40 are preferably lined with a coating of paraffin 43 or other thermo responsive lubricant before being filled with resin. The preferred resins are exothermic and generate heat as they harden, and their temperature is preferably controlled both for optimum hardening and also for heating up the paraffin or lubricant lining sufficiently so that rods 45 can be slipped easily out of tube 40. Tubes 40 are simply dipped in liquid paraffin 43 to produce the internal coating desired for rod removal.

The button blanks produced by slicer 41 are preferably placed in a curing medium to complete their cure, and are than fed to known machinery for turning and drilling buttons. The finished buttons are brightly colored and have clear and distinct color lines extending across their faces in generally parabolic patterns. Many different designs and coloring effects are possible by varying parameters as previously described, and any pattern can be reproduced as often as desired. Hence, especially attractive patterns can be made repeatedly in large quantities if desired.

FIGS. 2 – 4 show some variations in the basic invention to achieve desired effects. Many variations are possible within the scope of the invention, but only a few have been illustrated and described.

The casting tube 40 of FIG. 2 has a bottom cap 46 with a central hole for receiving a core rod or wire 47 held in place with a nut 48 or other retainer. A centering piece 49 holds the upper end of rod or wire 47 on the axis of tube 40, so that rod 47 extends the length of the axis of tube 40. Tube 40 is preferably dipped in liquid paraffin with rod 47 in place so that both the inside of tube 40 and rod 47 have a paraffin coating. Then when the cast resin rod is removed from tube 40, core rod 47 is also removed from the resin rod to produce a button rod having an axial hole. When such a cored rod is ground into beads, each bead has an axial bore so that no subsequent boring of the beads is necessary.

An array of two or more core rods 47 can also be arranged in any position in tube 40 to produce holes as desired in the blanks that are sliced from the cast resin rod. This can eliminate the later step of boring holes in each button blank. Furthermore, as suggested by FIG. 3, casting tubes can have different cross-sectional shapes such as the illustrated cross-sectional shape of tube 50. A core rod 51 properly located within casting tube 50 and held in place by pin 52 can produce the desired buttonhole in shank portion 53 of a rod 54 cast in tube 50. Rod 54 can then be ground into a succession of nearly spherical beads having shanks 53 with buttonholes produced by core rod 51. Many other cross-sectional shapes are possible, and many shapes of casting tubes can be combined with core rods in various positions to produce cast resin rods suitable for forming buttons and beads in many different patterns. The mottled or color pattern of any such rod can be angularly adjusted for the desired effects by orienting the casting tube at the desired angle relative to trough 39.

Experience has shown that two different colored resins can be fed to a single nozzle 38 as shown in FIG. 4 for depositing two different colored resins in the same zig zag path in trough 39. If two flexible lines 31 and 32 are joined in a Y 55 the two different colors can be moved side by side through a single flexible tube 56 into a nozzle 38 as illustrated. The two colored resins will fall side by side downward from nozzle 38 as illustrated, and each color will be laid in an adjacent zig zag pattern in trough 39. This economizes somewhat in equipment, and increases the variations possible with decorator 33.

Many different pumps, metering devices, mixers, and decorator arrangements can be used in the inventive equipment. For example, trough 39 can be reciprocated under fixed nozzles, and many variations can be made in angles of inclination, nozzle patterns, speeds, rates of flow, materials, and colors. The invention allows a wide scope to those skilled in the art in creating new patterns and designs, and reproducing those that are most attractive.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the many variations in the materials and equipment that can be made to satisfy various circumstances.

I claim:

1. Button rod making equipment comprising:
   a. means for supplying two parts of each of a plurality of different-colored, thixotropic resins;
   b. metering pumps fed by said supply means for combining said parts of each of said resins to form accelerated resins of different colors;
   c. static, in-line mixers fed by said pumps for mixing said parts of each of said accelerated resins and for reducing the apparent viscosity of said resins;
   d. nozzle means downstream from said mixers for delivering said resins;
   e. means for repeatedly moving said nozzle means reciprocally to deposit said resins in a predetermined zig-zag pattern;
   f. a downwardly inclined trough under said nozzle means for receiving said resins in said zig-zag pattern; and
   g. an inclined casting tube with a closed bottom end for receiving said resins pouring from a lower end of said trough so that said resins rest in said tube at a relatively high apparent viscosity.

2. The equipment of claim 1 wherein the inside of said casting tube has a thermo-responsive lubricant coating before receiving said resins.

3. The equipment of claim 1 wherein said nozzle means comprises a nozzle receiving and delivering two colors of said resins.

4. The equipment of claim 1 wherein said nozzle means comprises a plurality of nozzles each receiving and delivering one color of said resins.

5. The equipment of claim 1 including a single common driving means for said metering pumps for each color of said resins.

6. The equipment of claim 5 wherein said drive means is variable speed for regulating the flow of said resins.

7. The equipment of claim 1 wherein said means for moving said nozzle means includes a nozzle support element having a plurality of nozzle support stations at different radii, and drive means for arcuately reciprocating said element.

8. The equipment of claim 7 wherein said element reciprocating means is variable speed.

9. The equipment of claim 1 wherein said casting tube is inclined at approximately 45° to the vertical.

10. The equipment of claim 1 including a core rod arranged in said casting tube before flowing said resins into said tube.

11. The equipment of claim 10 wherein said core rod and the inside of said casting tube are coated with a thermo-responsive lubricant before receiving said resins.

* * * * *